United States Patent
Dellinger et al.

(10) Patent No.: US 12,174,325 B2
(45) Date of Patent: Dec. 24, 2024

(54) METHOD AND APPARATUS FOR PERFORMING EFFICIENT MODELING OF EXTENDED-DURATION MOVING SEISMIC SOURCES

(71) Applicant: BP Corporation North America Inc., Houston, TX (US)

(72) Inventors: Joseph Anthony Dellinger, Houston, TX (US); Esteban Diaz Pantin, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 291 days.

(21) Appl. No.: 17/785,395

(22) PCT Filed: Jan. 5, 2021

(86) PCT No.: PCT/US2021/012207
§ 371 (c)(1),
(2) Date: Jun. 14, 2022

(87) PCT Pub. No.: WO2021/141916
PCT Pub. Date: Jul. 15, 2021

(65) Prior Publication Data
US 2023/0051004 A1    Feb. 16, 2023

Related U.S. Application Data

(60) Provisional application No. 62/959,397, filed on Jan. 10, 2020.

(51) Int. Cl.
*G01V 1/00*    (2024.01)
*G01V 1/28*    (2006.01)
*G01V 1/38*    (2006.01)

(52) U.S. Cl.
CPC ............ *G01V 1/005* (2013.01); *G01V 1/3808* (2013.01); *G01V 1/28* (2013.01)

(58) Field of Classification Search
CPC ......... G01V 1/005; G01V 1/3808; G01V 1/28
See application file for complete search history.

(56) References Cited

U.S. PATENT DOCUMENTS

| | | | | | |
|---|---|---|---|---|---|
| 6,151,556 | A | * | 11/2000 | Allen | G01V 1/364 702/18 |
| 2013/0343153 | A1 | * | 12/2013 | Laws | G01V 1/3861 367/21 |

(Continued)

FOREIGN PATENT DOCUMENTS

| | | | | | |
|---|---|---|---|---|---|
| BR | 112022013565 | A2 | * | 9/2022 | G01V 1/005 |
| EP | 4088144 | A1 | * | 11/2022 | G01V 1/005 |
| WO | WO-2021141916 | A1 | * | 7/2021 | G01V 1/005 |

OTHER PUBLICATIONS

PCT/US2021/012207 International Search Report and Written Opinion dated Apr. 14, 2021 (17 p.).

(Continued)

*Primary Examiner* — Daniel Pihulic
(74) *Attorney, Agent, or Firm* — CONLEY ROSE, P.C.

(57) ABSTRACT

Methods include receiving a set of seismic data including a seismic signal generated over the course of a set period of time as a time scale, partitioning the seismic signal into a predetermined integer number greater than one of partitioned seismic signals each associated with a respective fixed position associated with a respective time interval as a portion of the time scale, applying a pulse compression technique to each partitioned seismic signal of the predetermined number of partitioned seismic signals to generate a compressed partitioned seismic signal corresponding to each partitioned seismic signal of the predetermined number of partitioned seismic signals, and inserting the compressed (Continued)

partitioned seismic signal corresponding to each partitioned seismic signal of the predetermined number of partitioned seismic signals in parallel into a velocity model builder. In addition, the methods include summing generated results therefrom to model the seismic signal for the time scale.

19 Claims, 10 Drawing Sheets

(56) References Cited

U.S. PATENT DOCUMENTS

| | | | |
|---|---|---|---|
| 2016/0187513 A1* | 6/2016 | Poole | G01V 1/362 |
| | | | 702/16 |
| 2023/0051004 A1* | 2/2023 | Dellinger | G01V 1/005 |

OTHER PUBLICATIONS

PCT/US2021/012207 Submission of Informal Comments to the Written Opinion dated Apr. 14, 2021; Response filed May 25, 2021 (5 p.).

GCC Examination Report dated Oct. 25, 2021, for GCC Application No. 2021-41249 (5 p.).

* cited by examiner

METHOD AND APPARATUS FOR PERFORMING EFFICIENT MODELING OF EXTENDED-DURATION MOVING SEISMIC SOURCES

CROSS-REFERENCE TO RELATED APPLICATIONS

This application is a 35 U.S.C. § 371 U.S. National Stage Entry application of PCT/US2021/012207 filed Jan. 5, 2021, and entitled "Method and Apparatus for Performing Efficient Modeling of Extended-Duration Moving Seismic Sources," which claims benefit of U.S. provisional application Ser. No. 62/959,397 filed Jan. 10, 2020, and entitled "Method and Apparatus for Performing Efficient Modelling of Extended-Duration Moving Seismic Sources," each of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to performing efficient modeling, and more specifically, to modeling of extended-duration moving seismic sources.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits or formations suitable for long-term underground fluid storage. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Vibratory marine seismic sources are a topic of renewed interest in seismic acquisition. Marine sources are generally moving while sourcing, so a vibratory source's "shot point" will generally be spread out along the source's path, introducing a new complication for processing compared to traditional impulsive sources. If the source signature duration is relatively short, or the data are acquired with the sources and receivers moving together (e.g. streamer acquisition), or the moving sources or receivers are densely sampled, then there are existing methods for pre-processing the data to correct for the motion. After the correction, traditional processing (which assumes the sources and receivers are stationary) will then be applied to process the seismic data.

However, data generated from extended-duration or continuous sources shooting into stationary receivers, especially when the sources are sparsely sampled, may not be amenable to the pre-processing approach outlined above. In such cases, the sources' motion may instead be included in the wavefield extrapolation step of the processing algorithm (e.g. modeling, migration, inversion, etc.). However, inclusion of the motion of the sources may cause the processing to be less efficient.

For example, if the vibratory source's signature lasts for 100 seconds, but the waves of interest traverse the model in 20 seconds, their sum (120 seconds of propagation time) is modeled to capture the desired output. However, if the source were a traditional impulsive source instead of a vibratory source, modeling 20 seconds of propagation time would be sufficient to capture the desired result. Thus, brute-force modeling of the vibratory source's signature is 6 times more costly in view of the additional propagation time that is modeled.

For the case of a non-moving vibratory source, deconvolution or pulse compression can be utilized to cause the signature of the source to be more impulsive prior to injecting it into the numerical model to improve efficiency (similar to techniques for processing data from land vibratory sources). However, direct application of this technique may not yield accurate results when the seismic source is moving while sounding.

Typically, there are many more sources than receivers in seismic acquisition. The principle of seismic reciprocity states that the roles of sources and receivers can be swapped and the same data will be recorded (i.e., without affecting the recorded data). Additionally, it is possible to model one source sounding simultaneously into multiple receivers. Therefore, if there are more receivers than sources (e.g., 10 times as many receivers as sources), by making use of reciprocity we can process the data 10 times more efficiently. However, reciprocity does not directly apply if the sources and/or receivers are moving, so again, for the case of moving vibratory sources, there may be a significant penalty in computational efficiency.

In situations in which seismic data is acquired in a way that makes it difficult to use one of the existing techniques to pre-process the data to correct for the source motion, then one or more embodiments described herein can be used to more efficiently model a moving source in modeling, migration, and/or inversion algorithms. One such situation includes the source being recorded by stationary receivers where the source moves in jumps instead of continuously. By replacing the moving source with a sum of stationary ones, and noting that for each stationary source the computational techniques of deconvolution and reciprocity apply as usual, the correct generalizations and applications of the techniques described above can be determined and then applied to the case of a continuously moving source. While an accompanying computational increase occurs, by taking advantage of the linearity of the wave equation, most of the efficiency savings of the computational techniques can be maintained.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
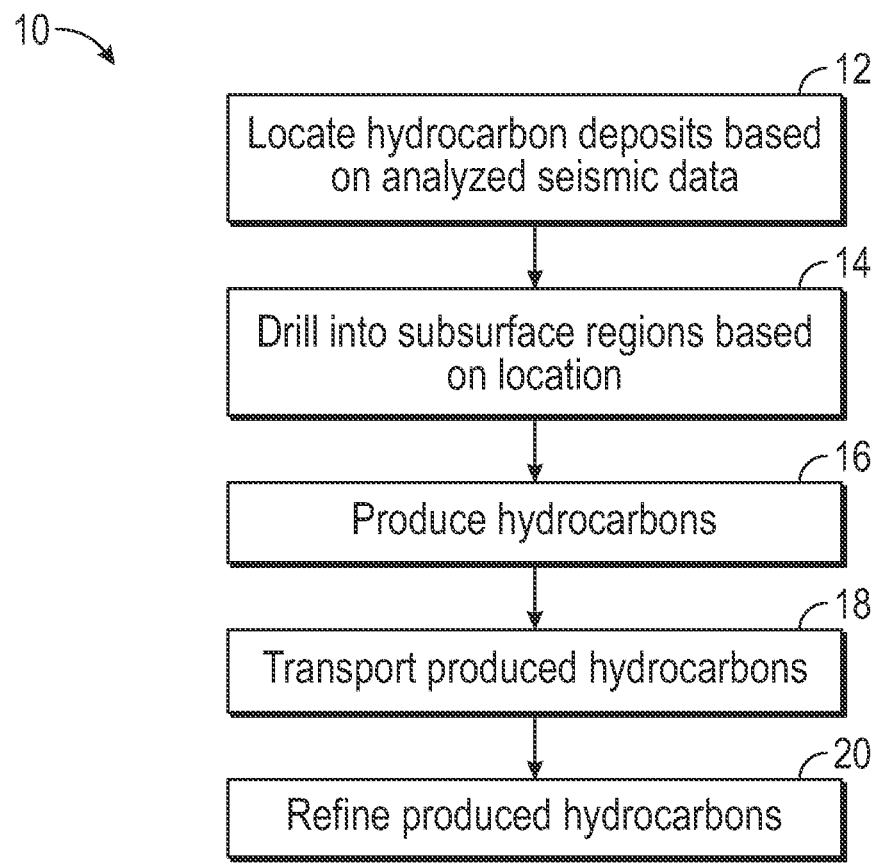
FIG. 1A illustrates a first flow chart of various processes that may be performed based on analysis of seismic data acquired via a seismic survey system, in accordance with an embodiment.
Figure 1B:
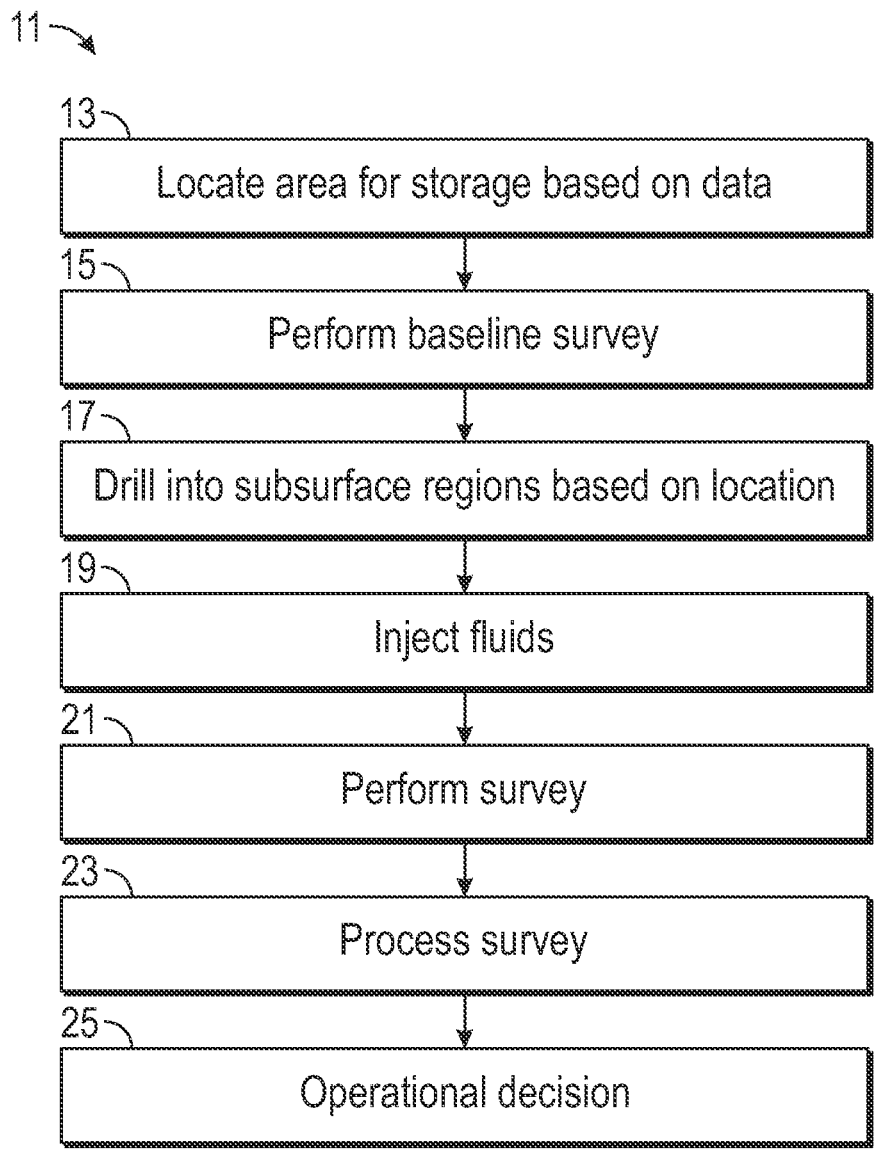
FIG. 1B illustrates a second flow chart of various processes that may be performed based on analysis of seismic data acquired via a seismic survey system, in accordance with an embodiment.
Figure 2:
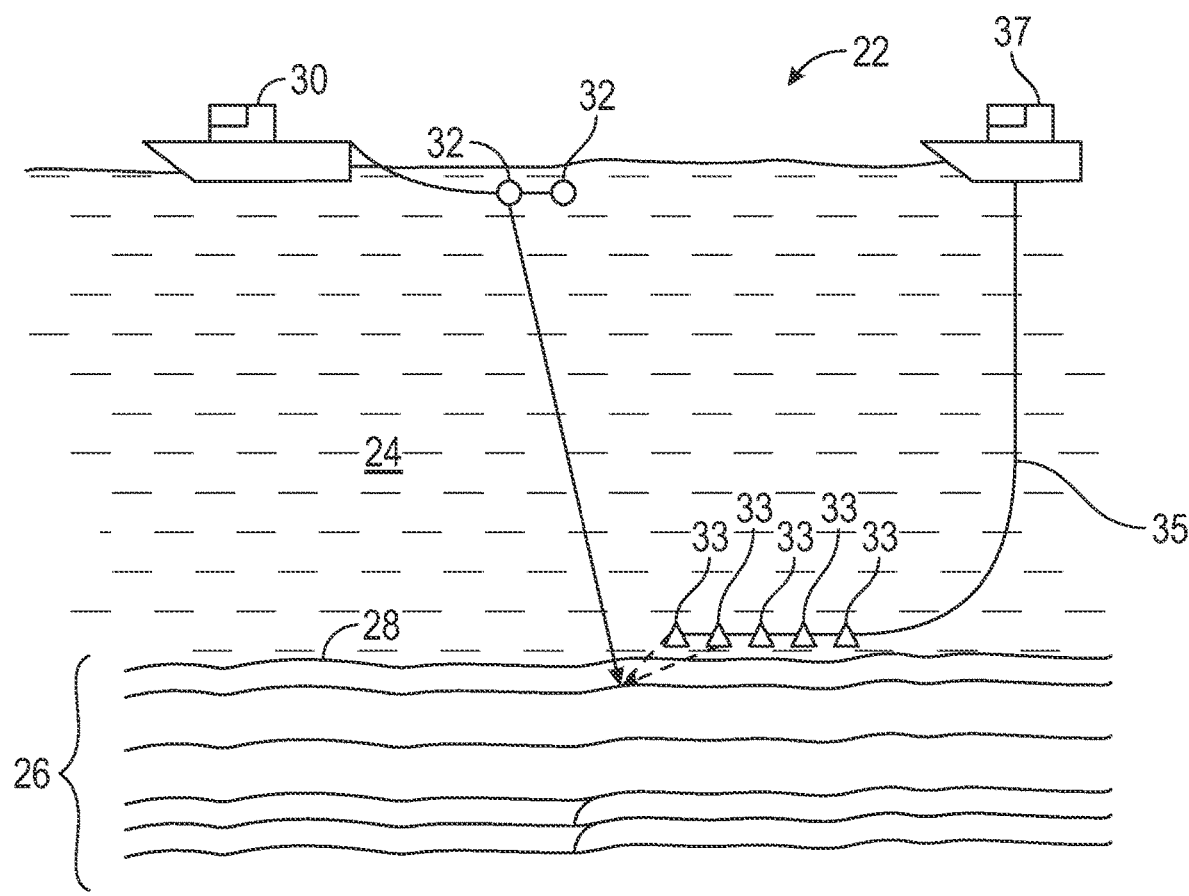
FIG. 2 illustrates a marine survey system in a marine environment, in accordance with an embodiment.
Figure 3:
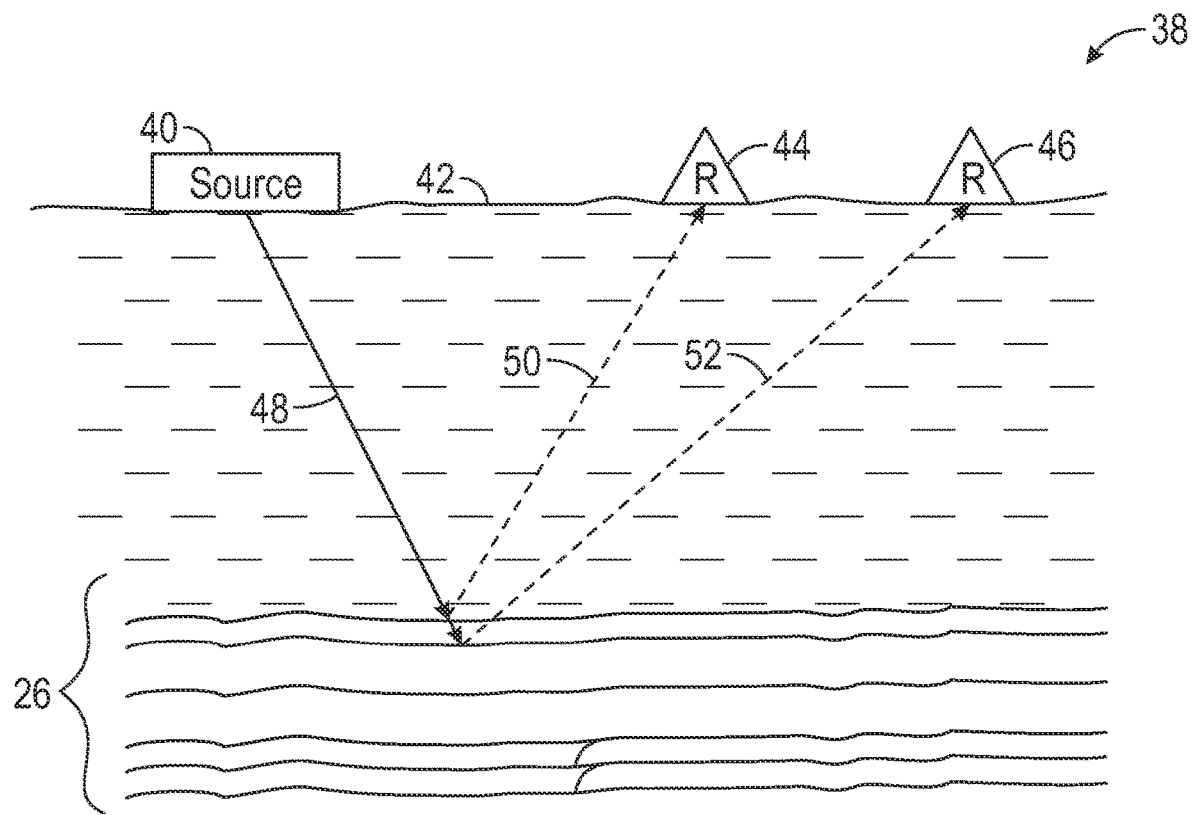
FIG. 3 illustrates a land survey system in a land environment, in accordance with an embodiment.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1A illustrates a flow chart of a method 10 that details various processes that may be undertaken based on the analysis of the acquired seismic data for the purpose of oil/gas production. Likewise, FIG. 1B illustrates a method 11 that details an alternative workflow that may be undertaken for the purpose of carbon capture and storage. Although methods 10 and 11 are described as consisting of steps that occur in a particular order, it should be noted that the steps in methods 10 and/or 11 may be performed in any suitable order.

Referring now to FIG. 1A, at block 12, locations and properties of hydrocarbon deposits within a subsurface region of the Earth associated with the respective seismic survey may be determined based on the analyzed seismic data. In one embodiment, the seismic data acquired may be analyzed to generate a map or profile that illustrates various geological formations within the subsurface region. Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

Method 11, as illustrated in FIG. 1B, is similar to method 10 except that the goal is not removing hydrocarbons from the Earth but safely storing unwanted fluids in the Earth. Block 13 is analogous to block 12, except the goal is to identify locations with underground formations suitable for storage. Block 13 may be performed using, for example, existing data, such as, seismic data, well logs, etc. It is desirable to verify (for example, in real time) that the storage is successful, so, in block 15, a baseline seismic survey is acquired. Typically block 15 is performed prior to the injection of any fluids into the Earth. Block 17 is analogous to block 14 of method 10 and block 19 is analogous to block 16 of method 10, but again with the goal of injecting fluids (e.g., gasses or liquids) into an underground reservoir instead of extracting oil or gas. At block 21 an additional survey is conducted. This survey may be a monitoring survey over the area of the injection and, in some embodiments, may be a "4D" seismic survey that monitors the area of the injection over time.

In block 23, the survey from block 21 is processed. This may include performing 4D processing on the seismic survey to monitor subsurface fluid motion and to determine if the motion is as expected (i.e., the data in block 23 is analyzed to monitor the status of the injected fluids). At block 25, an operational decision is made based on the results of block 23 as to whether to continue the injection at the current well (e.g., return to step 19), drill a new well nearby (e.g., return to step 17), or cease injection in the area.

With the foregoing in mind, FIG. 2 is a schematic diagram of a marine survey system 22 (e.g., for use in conjunction with block 12 of FIG. 1A or block 13 of FIG. 1B) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28. The marine survey system may be an Ocean Bottom Seismic (OBS) system that operates to generate seismic data (e.g., OBS datasets).

The marine survey system 22 may include a vessel 30, one or more seismic sources 32, an ocean-bottom cable 35, one or more (seismic) receivers 33 along the cable 35, and/or other equipment that may assist in acquiring seismic images representative of geological formations within a subsurface region 26 of the Earth located beneath the seafloor 28. The vessel 30 may tow the seismic source(s) 32 (e.g., an air gun array) that may produce energy, such as sound waves (e.g., seismic waveforms), that is directed at a seafloor 28. The ocean-bottom cable 35 includes one or more receivers 33 (e.g., hydrophones) that record seismic waveforms that represent the energy output by the seismic source(s) 32 subsequent to being reflected off of various geological formations (e.g., salt domes, faults, folds, etc.) within the subsurface region 26. For example, data may be stored in the one or more receivers 33 for an extended period of time (e.g., hours, days, weeks, or longer) prior to the stored data being retrieved (either via cable 35 or optically, or downloaded after recovery). As illustrated, the one or more receivers 33 may be coupled to a vessel 37 (and, in some embodiments, to one another) via the cable 35. The ocean-bottom cable 35 may be a fiber-optic cable utilizing distributed acoustic sensing techniques to synthesize receivers at arbitrary locations along its length. Moreover, data acquired via the one or more receivers 33 may be transmitted via the cable 35 to the vessel 37 (or, for example, optically or after recovery if the OBS system is an Ocean Bottom Node system).

Moreover, while the illustrated OBS system is an Ocean Bottom Cable (OBC) system inclusive of one or more receivers 33 disposed on the seafloor 28 coupled via a cable 35 to a second vessel 37, other embodiments of an OBS system, such as an Ocean Bottom Node (OBN) system or any other seismic recording system may be utilized. That is, there may be no cable 35, with the receivers 33 instead deployed individually as nodes, which may be located on the seafloor 28, or tethered, floating, or actively maneuvering in the water column. In some embodiments, the cable 35 may be located in the water column instead of on the seafloor 28. The second (recording) vessel 37 may instead be a fixed structure such as a platform, or the cable 35 may run to shore and terminate on land. The receivers 33 may be located inside a borehole (e.g. as part of a Vertical Seismic Profile recording system), or trenched into the sea floor.

Additionally, although the description of the marine survey system 22 is described with one seismic source 32 (represented in FIG. 2 as an air gun array) and one type of receiver 33 (represented in FIG. 2 as a set of hydrophones), it should be noted that the marine survey system 22 may include multiple seismic sources 32 and one or more receivers 33, and these may be of multiple types. In the same manner, although the above descriptions of the marine survey system 22 are described with ocean-bottom cable 35, it should be noted that the marine survey system 22 may include multiple cables 35 similar to cable 35. In addition, additional vessels 30 may include additional seismic source(s) 32 to perform the operations of the marine survey system 22, and the additional sources may be of different types. The vessels 30 may also tow streamers with additional receivers 33 that move with the sources 32 (e.g., traditional towed-streamer recording). In some embodiments all the receivers 33 may move with the sources 32.

In some embodiments, the OBS system may be utilized to acquire OBS datasets that are useful in reservoir mapping and characterization. These OBS datasets typically have a bandwidth from approximately 2 Hz to 100 Hz with relatively high signal-to-noise ratio (SNR) results at low frequencies (e.g., at less than or equal to approximately 50 Hz, 40 Hz, 35 Hz, etc.) relative to 3DHR datasets. Therefore, the OBS dataset is complementary with respect to the bandwidth of a 3DHR dataset acquired via the marine survey system 22 (e.g., acquired via a 2D high-resolution seismic acquisition, a 3D high-resolution seismic acquisition, or the like).

Although the methods and systems described herein are primarily directed to marine applications, they also may be applicable in land seismic operations, e.g. to the case of a moving vibratory land source. Regardless of how the seismic data are acquired, a computing system (e.g., for use in conjunction with block 12 of FIG. 1A and block 13 of FIG. 1B) may analyze the seismic waveforms acquired by the seismic receivers 33, 44, and/or 46 to determine information regarding the geological structure, the location and property of hydrocarbon deposits, the area for storage of fluids, and the like within the subsurface region 26.

FIG. 3 is a block diagram of a land survey system 38 (e.g., for use in conjunction with block 12 of FIG. 1A and block 13 of FIG. 1B) that may be employed to obtain information regarding the subsurface region 26 of the Earth in a non-marine environment. The land survey system 38 may include a land-based seismic source 40 and land-based receiver 44. In some embodiments, the land survey system 38 may include multiple land-based seismic sources 40 and one or more land-based receivers 44 and 46. Indeed, for discussion purposes, the land survey system 38 includes a land-based seismic source 40 and two land-based receivers 44 and 46. The land-based seismic source 40 (e.g., seismic vibrator) may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
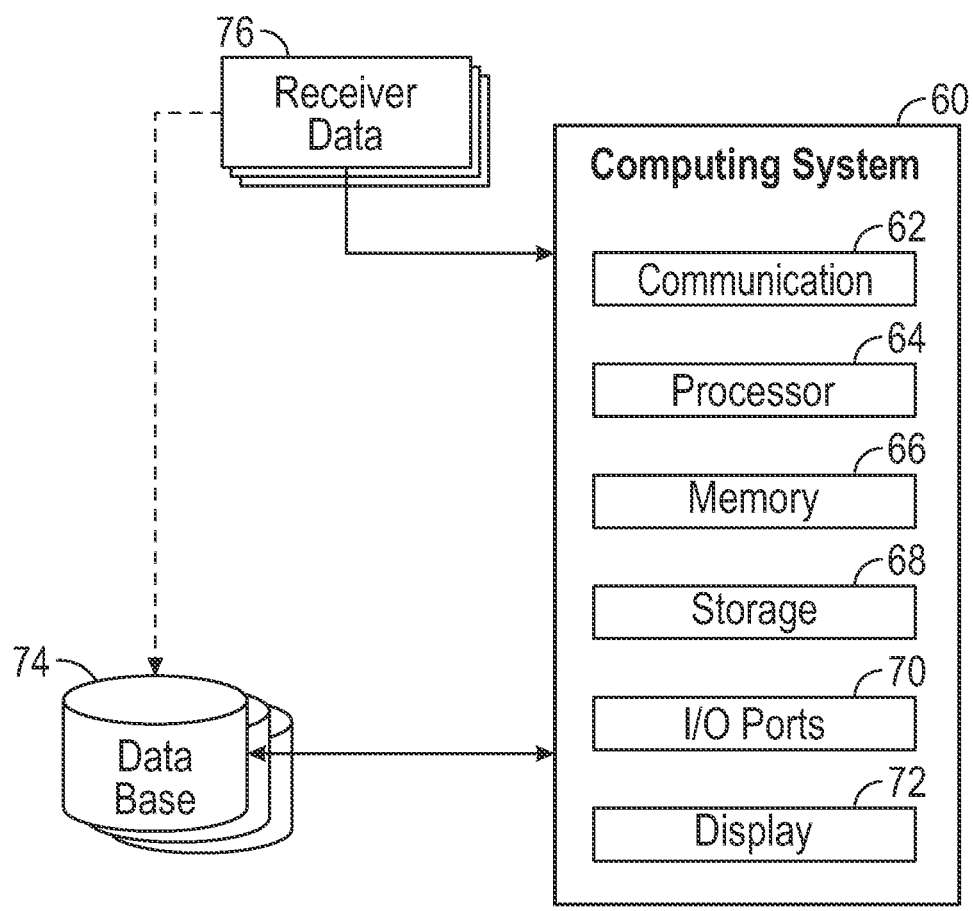
FIG. 4 illustrates a computing system that may perform operations described herein based on data acquired via the marine survey system of FIG. 2 and/or the land survey system of FIG. 3, in accordance with an embodiment.

Regardless of how the seismic data are acquired, a computing system (e.g., for use in conjunction with block 12 of FIG. 1A and block 13 of FIG. 1B) may analyze the seismic waveforms acquired by the receivers 33, 44, 46 to determine seismic information regarding the geological structure, the location and property of hydrocarbon deposits, and the like within the subsurface region 26. FIG. 4 is a block diagram of an example of such a computing system 60 that may perform various data analysis operations to analyze the seismic data acquired by the receivers 33, 44, 46 to determine the structure and/or predict seismic properties of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70. The communication component 62 may be a wireless or wired communication component that may facilitate communication between the receivers 33, 44, 46, one or more databases 74, other computing devices, and/or other communication capable devices. In one embodiment, the computing system 60 may receive receiver data 76 (e.g., seismic data, seismograms, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems 60. In this case, each computing system 60 operating as part of a super computer may not include each component listed as part of the computing system 60. For example, each computing system 60 may not include the display 72 since multiple displays 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the seismic sources 32 or 40, the receivers 33, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 2-D or 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1A or the method 11 of FIG. 1B that details various processes that may be undertaken based on the analysis of the acquired seismic data.

In some embodiments, the results of the seismic data analysis may be generated in conjunction with a seismic processing scheme that includes seismic data collection, editing of the seismic data, initial processing of the seismic data, signal processing, conditioning, and imaging (which may, for example, include production of imaged sections or volumes) prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result, location of hydrocarbons within a subsurface region 26 may be identified. Likewise, operational decisions 25 may be made based on the seismic data.

Marine vibratory marine seismic sources, as seismic source 32, are generally moving while sourcing, so a vibratory source's "shot point" will be spread out along the source's path. Although current land vibratory sources do not typically move while sourcing, future land vibratory sources may do so. A moving vibratory source's motion may introduce a new complication for processing compared to traditional impulsive sources (where the source imparts its energy into the subsurface 26 at approximately a single time or at a relatively short duration of time). If the source signature duration is relatively short, or the data are acquired with the sources and receivers moving together and the array of receivers spatially sample the wavefield sufficiently well (e.g. streamer acquisition), the data can be corrected for the motion so that traditional processing techniques will work to process the acquired seismic signal. However, extended-duration or continuous sources, especially shooting into stationary receivers (e.g., receivers 33), may require the modeling of the source as moving in our modeling, migration, and/or inversion algorithms. To perform this efficiently, reworking of two computational techniques, 1) pulse compression (deconvolution) of the source signature, and 2) using reciprocity to swap the roles of sources and receivers, is undertaken. As discussed in greater detail below, the continuous movement of the source can be approximated as moving in jumps instead of continuously, and is recorded by stationary receivers 33. By replacing a moving seismic source 32 with a sum of stationary ones, and noting that for each stationary seismic source 32 the standard computational techniques of deconvolution and reciprocity apply as usual, the approximation (moving in jumps) can be utilized to form correct generalizations and can be applied to the case of a continuously moving seismic source 32. While an accompanying computational increase occurs, by taking advantage of the linearity of the wave equation, most of the efficiency savings of the computational techniques can be maintained.

Generally, seismic processing algorithms assume stationary sources (e.g., seismic source 32) and receivers (e.g., receivers 33). In typical acquisition, while the hardware of the seismic source 32 may be towed (moving), the released bubble(s) of air that operate as the source are stationary. Therefore, knowing the location of the seismic source 32 when fired gives the location of the shot, i.e., the shot location. Likewise, even if receivers 33 are towed, the location of each receiver 33 at a given time is known. This provides the location of the receiver 33 as it records a wavefield and, as the receivers 33 are typically numerous and closely spaced, the recorded wavefield can be interpolated back onto a non-moving recording grid, exactly as if it had been recorded with stationary receivers 33. Thus, it is typical to take the data as recorded (with motion due to the seismic sources 32 and/or receivers 33 being towed), perform a shifting interpolation on the data to correct for the receiver motion (i.e., motion correction pre-processing of the received data), then apply processing algorithms as if the data were generated and received by fixed seismic sources 32 and receivers 33.

Figure 5:
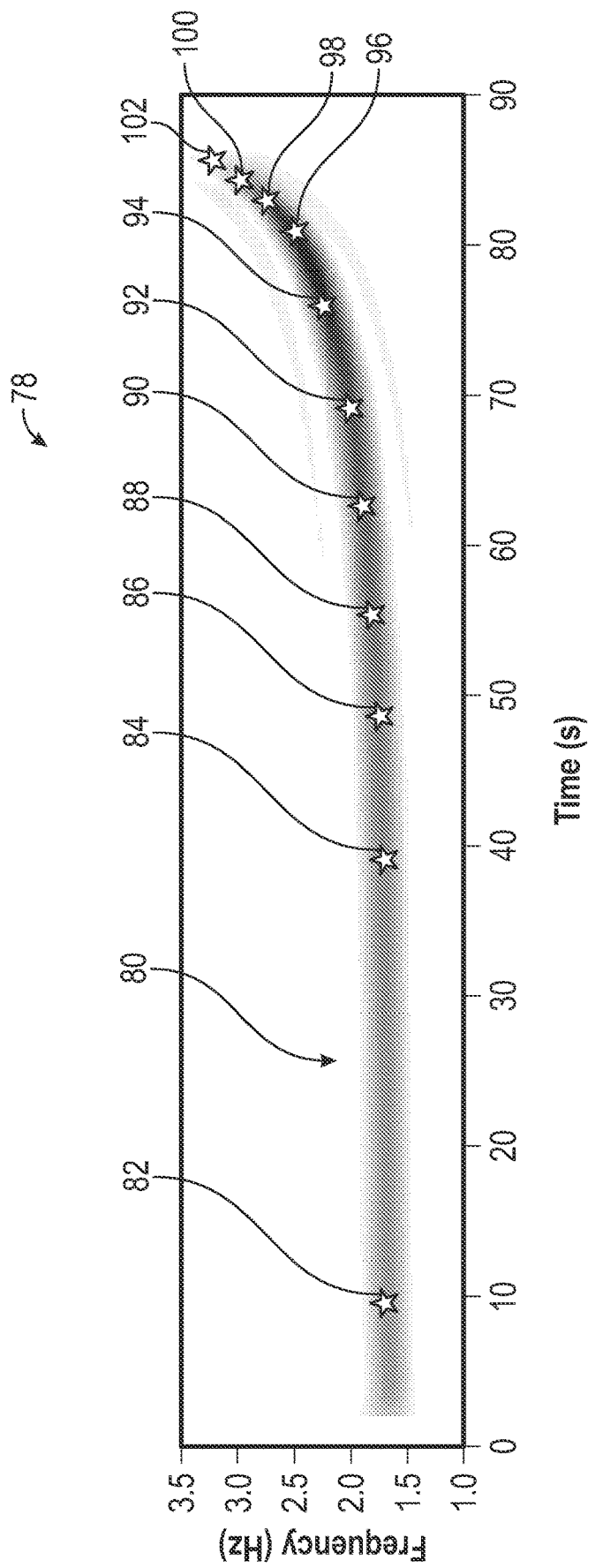
FIG. 5 illustrates a graph 78 of a frequency of a seismic source signal for a seismic source of FIG. 2 that is moving, in accordance with an embodiment.

For a non-impulsive seismic source (where the seismic source imparts its energy into the subsurface 26 over a relatively long period of time rather than at approximately a single time or at a relatively short duration of time) as the seismic source 32, the frequency often monotonically increases or decreases over time. An example of this is illustrated in the graph 78 of FIG. 5. As illustrated, in the graph 78, the frequency of the seismic source signal 80 increases over time as it moves (e.g., as it is towed). This allows for a determination of the location (position) of the seismic source for a given recorded seismic signal, since the frequency corresponds to the source time. For example, as illustrated, various frequencies of the seismic source signal 80 occur at corresponding times and there is a one-to-one relationship between the position of the seismic source 32 and the frequency illustrated as average shot times 82, 84, 86, 88, 90, 92, 94, 96, 98, 100, and 102.

Thus, taking the data as recorded (with motion due to the seismic sources 32 and/or receivers 33 being towed), a similar process to that described above with respect to impulsive seismic sources 32 may be undertaken. More particularly, the recorded wavefields can be interpolated onto a new stationary or fixed grid using the frequency to determine the location of the seismic source 32 as the sound was generated. In this manner, the data as recorded can have a source motion correction applied thereto, a receiver motion correction applied, which results in data with fixed seismic sources 32 and receivers 33 to which processing algorithms are applied as if the data were generated and received by fixed seismic sources 32 and receivers 33.

However, in more general cases (i.e., where the seismic sources 32 are arbitrary), the data may not be sufficiently spatially sampled (e.g., the seismic sources 32 may be fired or positioned too infrequently to provide a sufficient sampling of the wave field), which may be a result of long sweep times, the result of adding additional frequencies (e.g., high frequency transmissions on the end of low frequency sweep), harmonics, etc., that are not sufficiently well sampled. Likewise, the source signature could be scrambled (e.g., may include white or pseudo-random noise), such that the source frequencies are scrambled along the source path and there is not a simple relationship between frequency and source time. These issues can be modeled "as is", i.e., with the processing in the computer mirroring the actual acquisition. However, this is computationally inefficient and costly. Alternatively alternate solutions are available, as discussed below.

Present embodiments herein are described in conjunction with situations in which there is a fixed receiver 33 (e.g., an OBS system, such as an OBN system) and moving seismic sources 32. However, the techniques described herein also may be used in situations where the receivers 33 are moving and the seismic sources 32 are fixed, or where both sources 32 and receivers 33 are moving but the data can be pre-processed to simulate data recorded with either stationary sources 32 or stationary receivers 33, for example using the techniques already described. Thus, as described below, the problem being considered is for OBN acquisition with an arbitrary source (e.g., the seismic source 32 can me moving, well sampled, poorly sampled, an arbitrary source signature, etc.). The receivers 33 are stationary receivers. There are techniques that typically are used to process data in the OBN system, for example, reciprocity. There are typically many more shot points than there are receivers 33 and reciprocity allows for the swapping of the roles of sources (e.g., shot points of the seismic source 32) and receivers (so as not to model the wave field from each shot into the fewer number of receivers 33). Reciprocity provides that for a seismic source 32 and receiver 33, the trace that is recorded for that shot-receiver pair is identical if the roles of the seismic source 32 and receiver 33 are interchanged. This allows the receivers 33 (fewer in number) to be treated as sources, whereby each receiver 33 is a point having the source emanating therefrom and to the shot locations, which provides the same data set but is computationally more efficient to produce.

Often a notional receiver 33 is in reality an array of physical receivers, with the recorded output being a weighted sum of the recordings from all the receivers in the array. Similarly a vibratory source 32 or 40 often contains multiple sourcing elements (of identical or differing sizes) operating in unison. The principle of reciprocity is directly applicable to the case of a single source and a single receiver, with each being either a point or an array. The source and/or receiver may also have an antenna pattern, for example a marine pressure source being recorded by a vertical geophone on the ocean floor, and reciprocity applies in this case as well. Although the following discussion speaks in terms of omnidirectional point sources and receivers, one of ordinary skill in the art can readily apply the methods described herein to the case of source and/or receiver arrays and of different types of sources and/or receivers.

Reverse-time migration and Full-Waveform Inversion both rely on propagating wavefields forward and/or backwards in time, so the question for application to moving seismic sources 32 effectively reduces to doing wave propagation with a moving seismic source 32. Modeling a moving seismic source 32 (or receiver 33) is possible, but it introduces extra computations regarding source injection and/or receiver sampling. However, if the source signature extends longer than the time it takes for the waves of interest to make their way from the seismic source 32 to receiver 33, then the extra propagation time required to insert the lengthy source signature can entail a significant increase in computational cost. For a stationary seismic source 32, there is a simple solution: first deconvolve the source signature to compress it in time, and then inject the deconvolved signature. For example, in land vibroseis acquisition (e.g., similar to that described in conjunction with FIG. 3), where there is an extended-time source signature, pulse compression (e.g., deconvolution) is typically utilized to make the signature more impulsive (e.g., to transform a non-impulsive source signature into an impulsive source signature).

Unfortunately, this technique may not be readily applicable to a moving seismic source 32. Furthermore, the technique of using reciprocity to swap the roles of sources and receivers 33 to gain a further significant reduction in computational cost (as there are usually have many more shot points than receivers) also may not be readily available for a moving seismic source 32, potentially greatly increasing the computational cost. However, as will be discussed below, while reciprocity and pulse compression techniques are not generally naively applicable when the seismic sources 32 (or receivers 33) are moving, embodiments herein will allow for recovery of most of the savings that would be present if reciprocity and pulse compression techniques were generally naively applicable when the seismic sources 32 (or receivers 33) are moving. An example will be discussed below of a simplified case of a moving seismic source 32 shooting into a fixed receiver 33. The technique may include approximating the seismic source 32 as moving in steps. This examples illustrates why the above noted techniques, unmodified, break down, as well as how to modify them so that they do work in the case involving a moving seismic source 32.

Figure 6A:
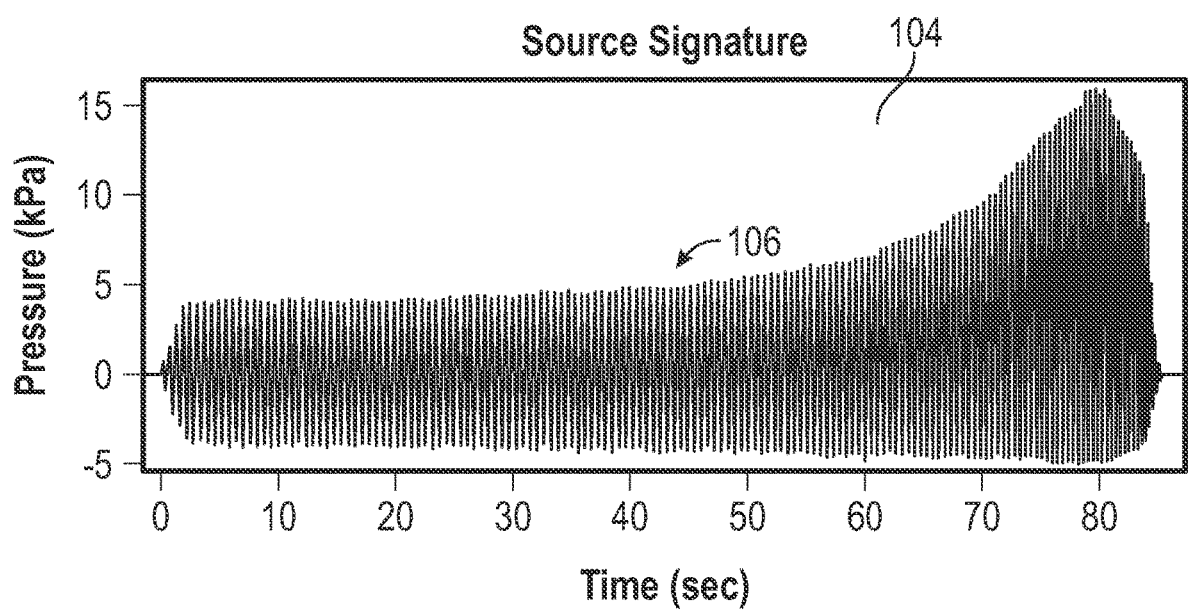
FIG. 6A illustrates a second seismic source signal for the seismic source of FIG. 2 that is moving and a resultant compressed seismic source signal of the second seismic source signal, in accordance with an embodiment.
Figure 6B:
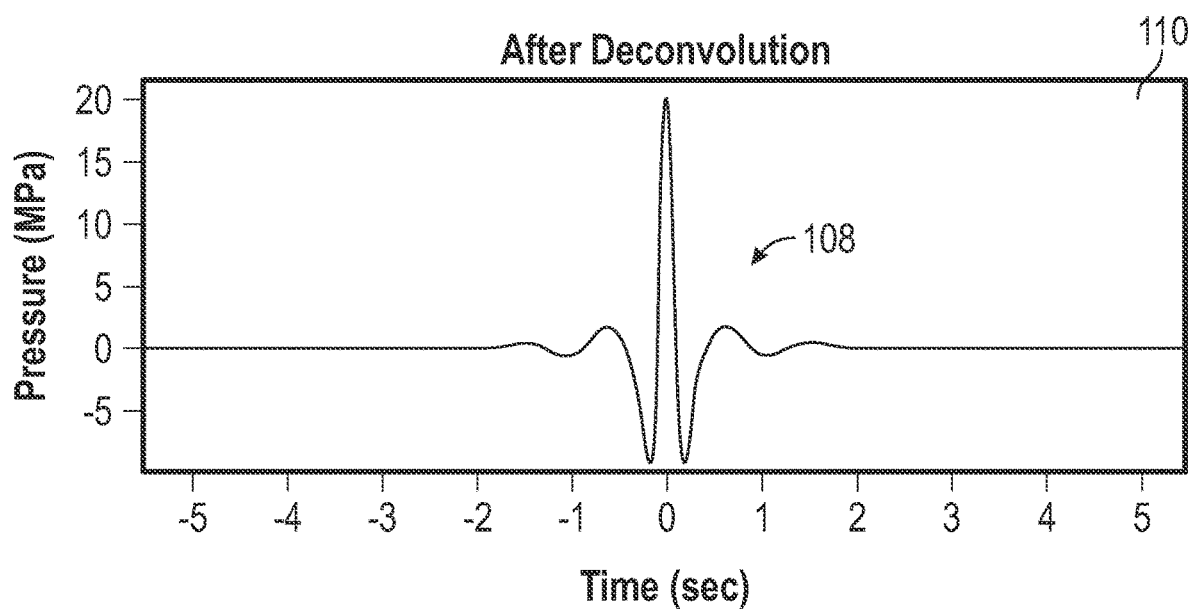
FIG. 6B illustrates a compressed seismic signal resulting from the application of pulse compression to the second seismic source signal of FIG. 6A, in accordance with an embodiment.

FIG. 6A illustrates a graph 104 of a seismic source signal 106 that increases in frequency over time as it moves (e.g., as it is towed). After applying pulse compression to the seismic source signal 106, the duration of the compressed seismic source signal 108 is shortened greatly (e.g., there is a greatly reduced sourcing time), as illustrated in the graph 110 of FIG. 6B. Thus, FIGS. 6A and 6B demonstrate how deconvolution can compress an extended-time source signature (seismic source signal 106) into a much more compact form (compressed seismic source signal 108). This has advantages for the purpose of modeling using the seismic source signal 106.

For example, assuming the last-arriving waves of interest take 25 seconds to travel from source to receiver, then for the seismic source signal 106 before deconvolution, there would be modeled approximately 85 seconds+25 seconds=110 seconds of propagation time, whereas after deconvolution (i.e., using the compressed seismic source signal 108), there would be modeled approximately 3 seconds+25 seconds=28 seconds, a 4-fold savings. This can be accomplished because modeling and deconvolution are both linear operations and commute. Mathematically, deconvolving the seismic source signal 106 of FIG. 6A to generate the compressed seismic source signal 108 of FIG. 6B before modeling with it produces the same result as modeling with the uncompressed source signature (seismic source signal 106) and then deconvolving the recorded output. However, if the seismic source 32 is moving there is the additional step of moving the seismic source 32 along its path as it is sounding, and this step does not commute with deconvolution. After pulse compression, the entire source signature (seismic source signal 106) must "happen all at once" along the full path of the seismic source 32. Accordingly, in some embodiments, described herein are techniques to inject that into the model.

Figure 7:
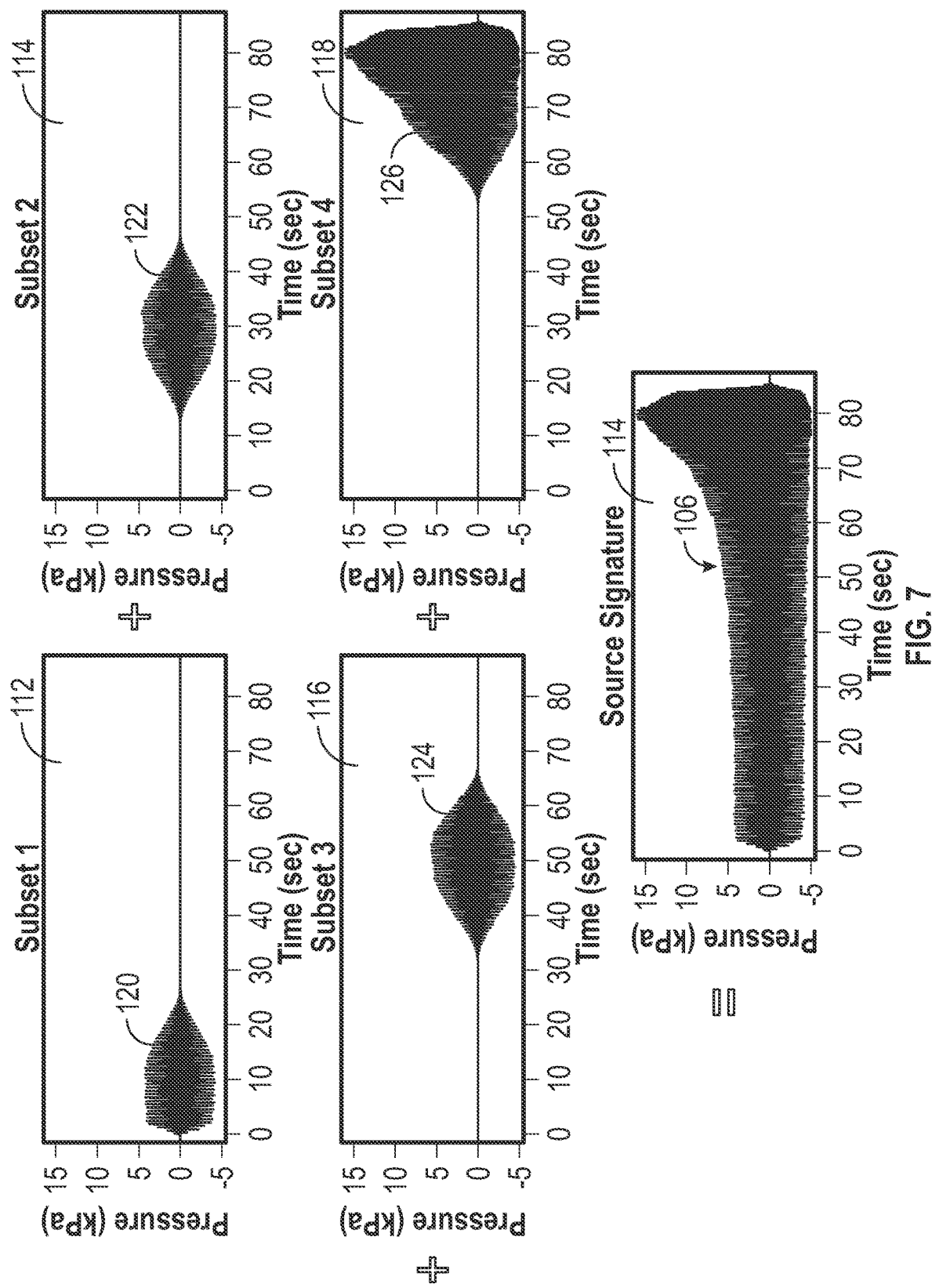
FIG. 7 illustrates the second seismic source signal of FIG. 6A broken into partitions, in accordance with an embodiment.

FIG. 7 illustrates the graph 104 of the seismic source signal 106 (uncompressed) as broken into partitions, here presented in graphs 112, 114, 116, and 118. Partition 120 of graph 112 can be summed with partition 122 of graph 114, partition 124 of graph 116, and partition 126 of graph 118 to result exactly in the seismic source signal 106 of graph 104. In this manner, the moving seismic source 32 is represented as a sum of stationary sources, each having a seismic source signal represented by the respective partitions 120, 122, 124, and 126 (i.e., the seismic source signal 106 is broken up into four intervals, whereby each interval is associated with a fixed position along the track of the moving seismic source 32, thereby approximating the source as moving in discrete jumps). It should be noted that dividing up the source trajectory into four intervals is an example and that greater or fewer than four intervals can be chosen, for example, based on the characteristics of the seismic source signal 106.

Figure 8:
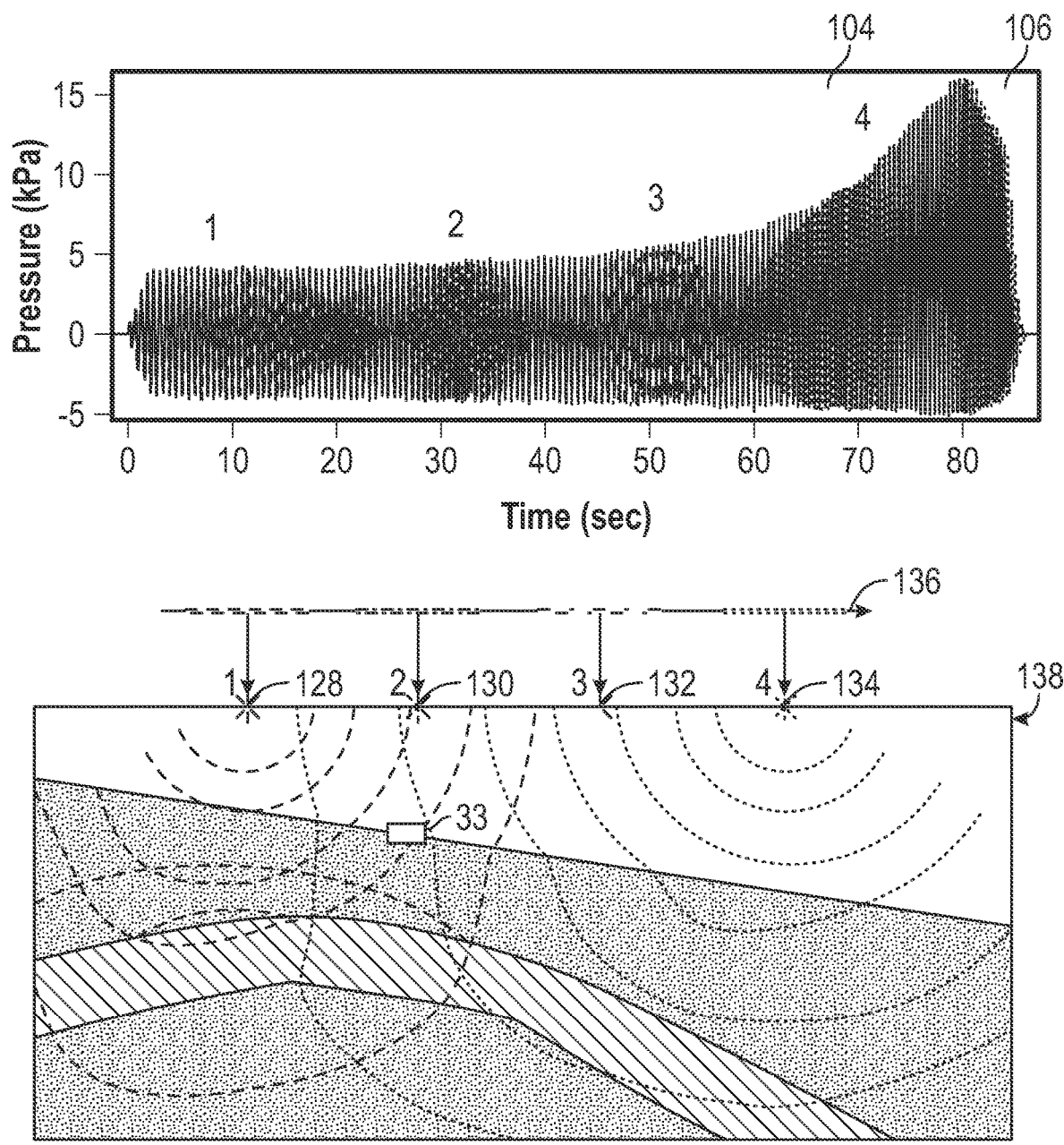
FIG. 8, illustrates the second seismic source signal of FIG. 6A and the partitions of FIG. 7 as associated with respective positions along a moving trajectory of the seismic source of FIG. 2 that is moving, in accordance with an embodiment.

As illustrated in FIG. 8, in this jumping-source approximation of continuous motion, the first, second, third, and fourth interval sources (representing partitions 120, 122, 124, and 126) are each associated with a respective position (position 128, 130, 132, and 134) along the moving trajectory 136 of the seismic source 32 in a velocity model 138. A seismic image may be constructed using a high resolution seismic velocity model, such as a full waveform inversion (FWI) model, a tomography model, or the like, applied, for example, via a velocity model builder. The velocity model 138 may include data indicative of a change in velocity of the seismic waveforms during propagation through the subsurface region 26. A stationary ocean-bottom receiver 33 is illustrated as well as wavefronts for position 128 and position 134. In this manner, instead of a having a continuous source location, the locations of the seismic source 32 can be approximated as fixed sources at the positions 128, 130, 132, and 134. While this is an approximation, as more positions are added, in the limit, the continuous moving source is modeled. And, by approximating the continuously moving seismic source 32 as a fixed seismic source 32, pulse compression, reciprocity, etc. are directly applicable to the fixed sources at the positions 128, 130, 132, and 134.

In the illustrated jumping-source approximation of continuous motion in FIG. 8, the first, second, third, and fourth interval sources at positions 128, 130, 132, and 134, each operate in turn over the original source's extended time scale (e.g., the time scale of the seismic source signal 106). However, this may not lead to efficient modeling. For example, one issue with continuously moving seismic sources 32 is that deconvolution may not commute with source motion. The few seconds of energy illustrated in graph 110 was, in reality, inserted into the seafloor 28 over the course of approximately 90 seconds. Therefore, an issue arises as to how along the moving source path (i.e., the moving trajectory 136 of the seismic source 32) should the pulse of energy represented by the compressed seismic source signal 108 be inserted.

Accordingly, instead, one model can be performed for each interval. Thus, for each partition 120, 122, 124, and 126, deconvolution can be performed. Thereafter propagation is performed over the time interval and the portion of the model corresponding to that interval's source, and these operations can be performed in parallel. The results (appropriately time- and space-aligned) may be summed together to model the full time span of the original seismic source 32. This is one embodiment to approximately model a moving seismic source 32 and, for some applications, may be selected. In some embodiments, the same deconvolution operator is applied to all partitions, for example, to allow for the results to be summed together to produce an equivalent result to modeling the jumping sources sequentially (but overlapping) in a single model and then applying the deconvolution operator to the result.

By decomposing the problem into a sum of stationary-source models we can also determine how to correctly model with a pulse-compressed (deconvolved) source. Because the "interval sources" are not moving, in each model source signature (seismic source signal partitions 120, 122, 124, and 126) deconvolution may be performed before a wave extrapolation step. Deconvolving the signature of each stationary interval source can be accomplished using the same linear operator designed to deconvolve the original complete moving source signature (seismic source signal 106). The outputs of the four models may then be summed, which could also be achieved by simultaneously injecting all four deconvolved interval sources into a single model (i.e., because the same deconvolution operator was utilized for all the interval sources it can be applied before modeling).

Figure 9:
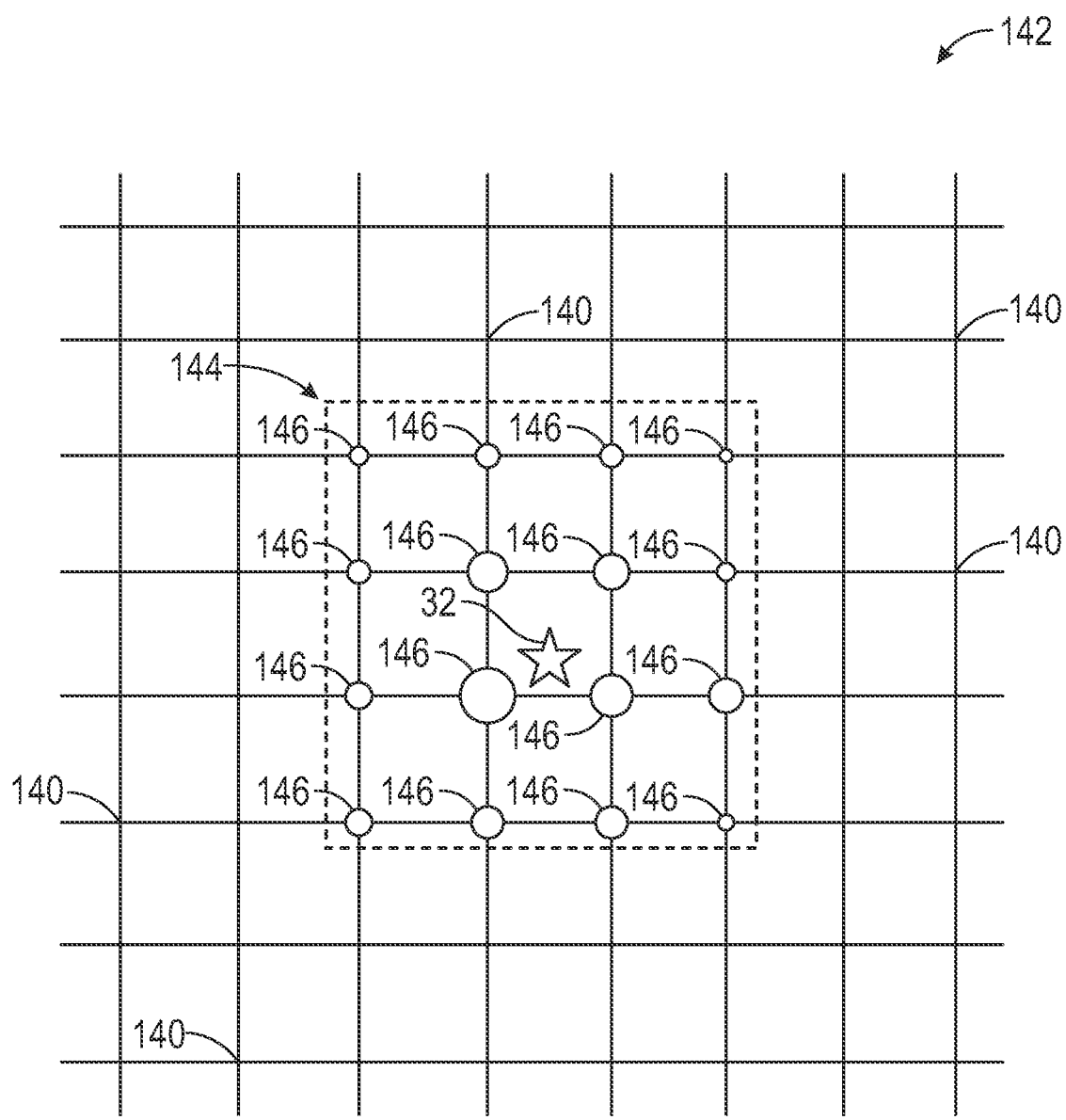
FIG. 9 illustrates a grid 142 of locations onto which the seismic source of FIG. 2 that is moving may be interpolated, in accordance with an embodiment.

However, other embodiments are described below with respect to continuously moving seismic sources 32, as represented on a discrete computational grid. In practice, a seismic source 32 may not be located exactly on a grid point 140 of a grid 142 of locations. Instead, the seismic source 32 may be interpolated onto a region 144 (e.g., an active interpolation region) of grid points 146 surrounding the location of the seismic source 32, as illustrated in FIG. 9. As the seismic source 32 moves along, grid points 140 near its path will enter the region 144 (outlined by a dashed line in FIG. 9), then leave it as the source moves on past. In some embodiments, the weighting factor applied to the source signature during the time a grid point 140 is within the active region 144 is determined by the weighting scheme being used to perform the interpolation, for example, sinc interpolation. As illustrated in FIG. 9, the varying size of the circles drawn around the active grid points 146 diagramatically indicates the magnitude of the corresponding instantaneous interpolation weights at the snapshot time shown in FIG. 9. This corresponds to the manner in which the seismic source signal 106 was divided into tapered (i.e. weighted) overlapping intervals 120, 122, 124, and 126 sourcing at locations 128, 130, 132, and 134, respectively, in FIGS. 7 and 8. The interpolation weights as a function of time determine the weighting function for each grid point 140.

Every grid point 146 that is active at any time along the path of the seismic source 32 acts as a stationary "interval source" (i.e., a partition source). To deconvolve a continuously moving seismic source 32, seismic source interpolation weights are calculated for each time and grid point 140 along the path of the seismic source. Next, the seismic source signature (seismic source signal 106) is multiplied by the calculated seismic source interpolation weights, time step by time step, to allocate the source signature amongst the nearby grid points 146. This is how a moving source is conventionally represented on a discrete grid. This procedure produces a subset source signature for each grid point 140 that ever lies within the active interpolation region 144 along the path of the seismic source 32. These affected grid points become the stationary interval sources, each with a corresponding subset source signature.

Thereafter, the subset source signature for each affected grid point 140 along the path of the seismic source 32 is pulse compressed using a global linear deconvolution operator (i.e., the same deconvolution operator is used for every affected grid point 140). Thereafter, the compressed signature for each grid point 140 along the path of the seismic source 32 may be injected simultaneously during propagation. In this manner, the pulsed-compressed data can be inserted (injected) at the same time along the entire path of the source. The source injection time is determined by the amount of compression of the interval source signatures, which may depend (at least in part) on the speed of the seismic source 32 relative to the spacing of the grid 142 of locations and on the bandwidth of the source signature. Thus, utilizing the above noted techniques, pulse compression (deconvolution) of the source signature (the seismic source signal 106) can be achieved for a continuously moving (vibratory) seismic source 32 in a manner similar to techniques for processing data from stationary land vibratory sources, such as seismic source 40.

Additionally, in some embodiments, it would be advantageous to utilize reciprocity to swap the roles of seismic sources 32 and receivers 33 for continuously moving (vibratory) seismic sources 32. The principle of seismic reciprocity is a consequence of a mathematical symmetry of the wave equation, and states that if the roles of a seismic source 32 and a receiver 33 are interchanged in a seismic model, producing a new reciprocal model, the exact same data trace will be recorded in both experiments. This is not equivalent to time reversal—the waves may take very different paths from source to receiver in the two experiments. Likewise, reciprocity does not say anything about what would be recorded at locations other than the particular receiver 33 corresponding to the source location in the reciprocal experiment. Reciprocity is particularly useful when modeling ocean-bottom seismic acquisitions because there are typically many more shot points (e.g., sources) than receivers 33. For example, instead of modeling wavefields emanating from millions of shots, we only need to model wavefields emanating from thousands of receivers 33 in the reciprocal experiments.

However, referring back to FIG. 8, when the seismic source 32 is moving, and it is modeled as a "jumping source" as in example of FIG. 8, a straightforward attempt to apply the principle of reciprocity to the moving-source case fails. If the problem is run as a unified extended-time model, then the ocean-bottom node turned source would emit the complete source signature (the seismic source signal 106), smoothly transitioning through each of the four interval source's subsets in turn. Meanwhile the jumping source (turned receiver 33) would listen first at the location 128 of the first source, then smoothly transition to the second location 130, then the third location 132, and finally the fourth location 134 (e.g., source position) in turn.

However, waves emitted, for example, during the initial first part of the source signature would continue to rattle around in the model after the receiver 33 had moved on. This can cause an issue, since the output data would then contain waves emitted during the first interval of the source signature but recorded by receivers 33 located at the second location 130, third location 132, and fourth location 134 (i.e., source positions), which have no reciprocal relationship with the original model. Thus, a naive attempt at applying reciprocity clearly fails in this example, and by extension to moving sources in general.

Instead, in one embodiment, the problem can be solved by breaking the problem down into a sum of the output of models in which the sources 32 and receivers 33 are stationary. In each of these "interval models" reciprocity applies as usual. Thus, the reciprocal experiments may be independently run, then the results may be summed, and it will produce the correct answer. This technique provides a way to parallelize the extrapolation. However, efficiency may be affected, as the interval models cannot be run in parallel inside the same model (because the interval source signatures differ between the models).

Thus, in another embodiment, all of the source signatures may be set to a common value (i.e., may be made the same), by once again appealing to the linearity of seismic modeling for stationary sources 32 and receivers 33. Thus, instead of injecting the source wavelet, an impulse (or band-limited impulse) can be injected, the results recorded, and then the recorded output convolved with the appropriate source wavelet. This technique may also be used more generally as a way of making forward modeling of vibratory signatures more efficient. It is, therefore, not limited to the above described technique or application.

Stated differently, the present embodiment takes advantage of the linearity of seismic modeling for stationary sources 32 and stationary receivers 33, since inputting the source signature and modeling it is equivalent to injecting an impulse, modeling it, and then convolving it with the source signature (since all these operations are linear, they can be convolved in any order to produce the same result). This is useful since now the source signature is the same for every partition (an impulse), meaning that the different modeling runs can be accomplished in parallel (simultaneously) in a single numerical model.

Thus, returning to FIG. 8, a delta function (e.g., a Dirac delta function) or a band-limited delta function may be inserted at the receiver 33 (i.e., the reciprocal source location), and measured (recorded or listened for) at the discrete sub-source locations (e.g., locations 128, 130, 132, and 134) along the source path (i.e., the moving trajectory 136 of the seismic source 32). Each wavefield that is recorded may then be convolved with the corresponding source signature partition, and then the results are summed together. Because the injected source function is the same for all the receivers, the computation may be done in parallel inside a single model. Thus, to perform reciprocal "jumping-source" modeling, the following steps may be undertaken: 1) inject an impulse or band-limited impulse at the location of the ocean-bottom receiver 33 turned source, 2) record the resulting wavefield at each of the interval-source locations (e.g., locations 128, 130, 132, and 134), 3) for each location 128, 130, 132, and 134), convolve each recorded wavefield with the corresponding interval-source signature, and 4) sum all the results together. Accordingly, to reciprocal model a continuously moving source shooting into a stationary receiver 33, each grid point 146 in the grid 142 along the path of the seismic source 32 is treated as an interval source location with its own unique interval source signature. As before, for further efficiency we can pulse-compress the signatures as this is performed, using the same deconvolution operator across all the intervals.

Finally, in some embodiments, both the seismic sources 32 and receivers 33 are independently moving. Referring back to FIG. 8, now both the seismic source 32 and the receiver 33 are in a different position in each interval model. This may prevent performing all the interval models together in a single extrapolation. In the most general case all the grid points 146 along the path of the seismic source 32 could interact with all the grid points 146 along the path of the receiver 33, which leads to large complexities. However, if the source signature has the form of a frequency sweep, this can be taken advantage of by breaking the source signature up into overlapping frequency intervals instead of overlapping time intervals. Non-adjacent frequency intervals can be designed to not overlap, and thus can be separated from each other after modeling by frequency filtering. Thus, in the "jumping source" example in FIG. 8, intervals 1 and 3 can be run together in the same model, and in parallel intervals 2 and 4 can be run together in the same model, then the results can be summed back together. It should be noted that deconvolution does not change the frequency bandwidth (it merely scales the amplitudes within the bandwidth) so it may be applied to compress the source signatures in this case.

Additionally, returning to FIG. 5, there is a strategy illustrated for calculating an average source position to use in a time or frequency window. The following equation 1 may be calculated:

$$<W(f)|FT(tW(t)Pa(t))|> / <W(f)|Ft(W(t)Pa(t))|> \quad (1)$$

where the angle brackets indicate summing over frequency, W(f) is an optional frequency-dependent weighting term specifying the frequency band being considered, W(t) is an optional time-dependent weighting term specifying the time interval being considered, FT indicates Fourier transformation from time t to frequency f, the vertical bars indicate taking the magnitude of the complex expression inside, and Pa(t) is a source signature amplitude as a function of time. The Fourier sum will pick out the stationary point for each frequency, which in the numerator is scaled by time, so dividing produces the time of the stationary point. To instead find the position of the stationary point, time may be replaced with position as the scale factor.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for modeling moving seismic sources, comprising:
   receiving a set of seismic data comprising a seismic signal generated over the course of a set period of time as a time scale;
   generating a predetermined number of partitioned seismic signals from the seismic signal, wherein each partitioned seismic signal is associated with a respective fixed position associated with a respective time interval as a portion of the time scale, wherein the predetermined number comprises an integer value greater than one;
   applying a pulse compression technique to each partitioned seismic signal of the predetermined number of partitioned seismic signals to generate a compressed partitioned seismic signal corresponding to each partitioned seismic signal of the predetermined number of partitioned seismic signals; and
   inserting the compressed partitioned seismic signal corresponding to each partitioned seismic signal of the predetermined number of partitioned seismic signals in parallel into a velocity model builder; and
   summing the results of the velocity model builder obtained after inserting the compressed partitioned seismic signal corresponding to each partitioned seismic signal into the velocity model builder to construct a seismic image based on the time scale, wherein the seismic image is representative of the subsurface region and used to determine locations and properties of hydrocarbon deposits in the subsurface region.

2. The method of claim 1, further comprising selecting a global deconvolution operator and applying the global deconvolution operator as part of the pulse compression technique applied to each partitioned seismic signal of the predetermined number of partitioned seismic signals.

3. The method of claim 1, wherein inserting the compressed partitioned seismic signal comprises inserting the compressed partitioned seismic signal corresponding to a respective partitioned seismic signal of the predetermined number of partitioned seismic signals.

4. The method of claim 1, wherein the seismic signal corresponds to a moving seismic source during the time scale.

5. The method of claim 1, wherein the seismic signal generated corresponds to a moving seismic receiver during the time scale.

6. The method of claim 1, wherein the seismic signal corresponds to a region of a plurality of grid points associated with a moving seismic source during the time scale or a moving seismic receiver during the time scale.

7. The method of claim 6, further comprising applying a respective weighting factor as a function of time to the seismic signal at each grid point of the plurality of grid points of the region to the seismic signal.

8. A method for modeling moving seismic sources, comprising:
   receiving a set of seismic data comprising a seismic signal generated over the course of a set period of time as a time scale;
   generating a predetermined number of partitioned seismic signals from the seismic signal, wherein each partitioned seismic signal is associated with a respective fixed position associated with a respective time interval as a portion of the time scale, wherein the predetermined number comprises an integer value greater than one;

inserting a delta function at a receiver having a first location;

recording a resulting wavefield measured at each respective fixed position in response to inserting the delta function at the receiver;

convolving the resulting wavefield at each respective fixed position with a corresponding partitioned seismic signal of the respective fixed position to obtain generated results, for the predetermined number of partitioned seismic signals, in parallel; and summing the generated results from the convolving of the resulting wavefield at each respective fixed position with the corresponding partitioned seismic signal of the respective fixed position to construct a seismic image based on the time scale, wherein the seismic image is representative of the subsurface region and used to determine locations and properties of hydrocarbon deposits in the subsurface region.

9. The method of claim 8, wherein the seismic signal corresponds to a moving seismic source during the time scale.

10. The method of claim 8, wherein the seismic signal generated corresponds to a moving seismic receiver during the time scale.

11. The method of claim 8, wherein the seismic signal corresponds to a region of a plurality of grid points associated with a moving seismic source during the time scale or a moving seismic receiver during the time scale.

12. The method of claim 11, wherein partitioning the seismic signal into the predetermined number of partitioned seismic signals comprises applying a respective weighting factor to the seismic signal at each grid point of the plurality of grid points of the region.

13. The method of claim 8, wherein inserting the delta function comprises inserting a band-limited impulse at the first location.

14. A tangible, non-transitory, machine-readable media, comprising instructions that when executed cause a processor to:

receive a set of seismic data comprising a seismic signal generated over the course of a set period of time as a time scale;

generate a predetermined number of partitioned seismic signals from the seismic signal, wherein each partitioned seismic signal is associated with a respective fixed position associated with a respective time interval as a portion of the time scale, wherein the predetermined number comprises an integer value greater than one;

apply a pulse compression technique to each partitioned seismic signal of the predetermined number of partitioned seismic signals to generate a compressed partitioned seismic signal corresponding to each partitioned seismic signal of the predetermined number of partitioned seismic signals;

insert the compressed partitioned seismic signal corresponding to each partitioned seismic signal of the predetermined number of partitioned seismic signals in parallel; and sum the results of the velocity model builder obtained after inserting the compressed partitioned seismic signal corresponding to each partitioned seismic signal to construct a seismic image based on the time scale, wherein the seismic image is representative of the subsurface region and used to determine locations and properties of the hydrocarbon deposits in the subsurface region.

15. The tangible, non-transitory, machine-readable media of claim 14, comprising instructions that when executed cause the processor to select a global deconvolution operator and apply the global deconvolution operator as part of the pulse compression technique applied to each partitioned seismic signal of the predetermined number of partitioned seismic signals.

16. The tangible, non-transitory, machine-readable media of claim 14, comprising instructions that when executed cause the processor to insert the compressed partitioned seismic signal corresponding to a respective partitioned seismic signal of the predetermined number of partitioned seismic signals.

17. The tangible, non-transitory, machine-readable media of claim 14, comprising instructions that when executed cause the processor to insert a band-limited impulse at the first location as a delta function inserted into the velocity model builder.

18. The tangible, non-transitory, machine-readable media of claim 14, comprising instructions that when executed cause the processor to apply a respective weighting factor as a function of time to the seismic signal at each grid point of a plurality of grid points of a region to the seismic signal to partition the seismic signal into the predetermined number of partitioned seismic signals.

19. The method of claim 8, wherein each respective fixed position is positioned at discrete sub-source locations along a source path of the one or more seismic sources.

* * * * *